United States Patent Office 3,769,364
Patented Oct. 30, 1973

3,769,364
CARBOXYPHENYL ESTERS OF PROPENYL AND PROPADIENYLPHOSPHONIC ACIDS
Janos Kollonitsch, Westfield, and George Gal, Watchung, N.J., assignors to Merck & Co., Inc., Rahway, N.J.
No Drawing. Original application July 14, 1969, Ser. No. 841,547, now Patent No. 3,666,838, dated May 30, 1972. Divided and this application Sept. 13, 1971, Ser. No. 180,153
Int. Cl. C07f 9/08, 9/38, 9/40
U.S. Cl. 260—941                                      1 Claim

ABSTRACT OF THE DISCLOSURE

Cis-1-propenyl phosphonic acid and propadienylphosphonic acid are made from propargyl alcohol and 2-halo-4-oxo-1,3-dioxa-2-phosphanaphthalene via reaction of the two, rearrangement of the resulting propargyloxy compound, reduction of the propadienylphosphonate thus formed and/or hydrolysis of the ester function. The intermediates for example, the o-carboxyphenyl ester of propadienylphosphonic acid or cis-1-propenylphosphonic acid, are novel compounds.

This is a division of application Ser. No. 841,547, filed July 14, 1969, now U.S. Pat. No. 3,666,838.

BACKGROUND OF THE INVENTION

This invention relates to novel methods for preparing cis-1-propenylphosphonic acid and propadienylphosphonic acid. It is concerned also with 2-substituted-4-oxo-1,3-dioxa-2-phosphanaphthalene-2-oxides which are intermediates in such syntheses. The process employs as starting material propargyl alcohol and 2-halo-4-oxo-1,3-dioxa-2-phosphanaphthalene and involves condensation of these products, rearrangement of the material thus obtained, selective reduction of the rearrangement product and finally generation of the free phosphonic acids.

The synthesis of certain propadienylphosphonate esters is described in U.S. Pat. No. 3,197,497, and the reduction of certain propadienylphosphonate esters to 1-propenylphosphonate esters is described in Tetrahedron Letters, No. 1, p. 15, 1968. The preparation of cis-propenylphosphonic acid from propargyl alcohol is also described in Belgian Pat. No. 723,076.

The process described herein was not, however, suggested by these publications because prior to our invention it was believed that the 2-propargyloxy-4-oxo-1,3-dioxa-2-phosphanaphthalene-2-oxide, which is a necessary intermediate in the process, would not rearrange to a propadienylphosphonate ester. See, for instance, Nesterov et al., Zh. Obshchei Kimii, 35, No. 11, p. 1997 (Engl. Ed.), 1965.

DESCRIPTION OF THE INVENTION

An object of this invention is to provide a novel process for making propadienylphosphonic acid and cis-1-propenylphosphonic acid from known starting materials. Another object is to provide novel compounds which are intermediates in such process. A further object is to provide a method whereby the desired propenyl and propadienylphosphonic acids are obtained in high purity and yield, and by a method which does not require the isolation and purification of intermediate products. A further object is to provide a process wherein the necessity for isolating and purifying intermediates is obviated because the individual reaction steps can be carried out without the generation of substantial amounts of unwanted by-products. Further objects will be evident from the ensuing description of the invention.

According to the present invention, cis-1-propenylphosphonic acid is prepared by the reaction of propargyl alcohol with 2-chloro-4-oxo-1,3-dioxa-2-phosphanaphthalene to produce 2-propargyloxy-4-oxo-1,3-dioxa-2-phosphanaphthalene, and rearrangement of this material to 2-propadienyl-4-oxo-1,3-dioxa-2-phosphanaphthalene-2-oxide. This latter product is selectively hydrogenated catalytically to the corresponding 1'-cis-propenyl ester, i.e., 2-(1'-cis-propenyl)-4-oxo-1,3-dioxa-2-phosphanaphthalene-2-oxide. On exposure to water this latter product is converted to the o-carboxyphenyl ester of cis-1-propenylphosphonic acid, and this ester hydrolyzed to the free acid at elevated temperature and/or in the presence of acid.

In an alternative embodiment of the process, the o-carboxyphenyl ester of propadienylphosphonic acid is produced from 2-propadienyl-4-oxo-1,3-dioxa-2-phosphanaphthalene-2-oxide, and this ester then either hydrolyzed to propadienylphosphonic acid or catalytically hydrogenated to the corresponding ester of 1-propenylphosphonic acid. The processes discussed above are set forth in the following structural diagram:

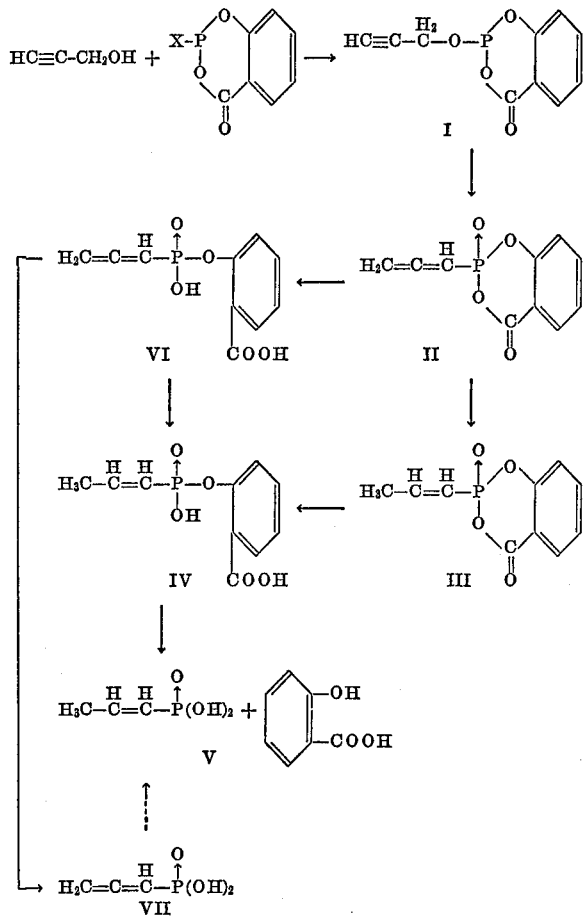

In the foregoing flowsheet X represents halogen, preferably chloro or bromo.

The cis-1-propenylphosphonic acid obtained as described herein is useful in making salts of (±)(cis-1,2-epoxypropyl)phosphonic acid and of (−)(cis-1,2-epoxypropyl)phosphonic acid, which compounds have antibacterial activity, as described in Belgian Pat. No. 723,072.

In the first step of this process a 2-halo-4-oxo-1,3-dioxa-2-phosphanaphthalene [J. Chem. Soc., 1249 (1960)] is reacted with propargyl alcohol to afford 2-propargyloxy-4-oxo-1,3-dioxa-2-phosphanaphthalene. The reaction is conducted in a suitable organic solvent medium. It is preferred for best yields that water be excluded to the extent employed as starting material with the resulting formation of the corresponding α:β unsaturated cis-phosphonic acid. Examples of other starting materials that might be mentioned are 3-butyn-2-ol, 2-methyl-3-butyn-2-ol and 3-methyl-4-pentyn-3-ol.

As previously stated, the process described above wherein salicylic acid is used as the ester blocking group for the phosphite and phosphonate intermediates is of substantial benefit since it permits the synthesis of cis-propenylphosphonic acid from propargyl alcohol in overall yields greater than 80% since the entire reaction sequence can if desired be carried out without isolation and/or purification of the intermediate products, and since salicylic acid is obtained on hydrolysis of the o-carboxyphenylphosphonate esters in sufficiently pure state to permit its reuse in preparing the starting material 2-chloro-4-oxo-1,3-dioxa-2-phosphanaphthalene.

The following examples are given for the purpose of illustration and not by way of limitation.

EXAMPLE 1

To a refluxing mixture of 21 g. of 2-chloro-4-oxo-1,3-dioxa-2-phosphanaphthalene in 90 ml. of toluene is added a solution of 5.6 g. of propargyl alcohol in 20 ml. of anhydrous toluene with good stirring over a period of 30 minutes. During the addition of propargyl alcohol at the boiling point of toluene 2-propargyloxy-4-oxo-1,3-dioxa-2-phosphanaphthalene is formed. This product rearranges under the reaction conditions to 2-propadienyl-4-oxo-1,3-dioxa-2-phosphanaphthalene-2-oxide.

At the end of the propargyl alcohol addition the toluene solution of 2-propadienyl-4-oxo-1,3-dioxa-2-phosphanaphthalene-2-oxide is cooled to 20–25° C. To it is added 7.4 g. of t-butanol. The product is hydrogenated at 40 lbs./p.s.i. with 1.0 g. of 5% palladium on charcoal catalyst. The theoretical amount of hydrogen is absorbed in 1 to 3 hours. The catalyst is removed by filtration and washed with 2× 2 ml. of toluene. The combined filtrates and washes are concentrated in vacuo and the oily residue of 2-(1'-cis-propenyl)-4-oxo-1,3-dioxa-2-phosphanaphthalene-2-oxide weighing 22.5 gm. is used directly in the next reaction without any purification.

Into a 500 ml. three-necked flask, equipped with stirrer, and reflux condenser is charged at room temperature 105 ml. of water and 22.5 g. of 2-(1'-cis-propenyl)-4-oxo-1,3-dioxa-2-phosphanaphthalene-2-oxide. The original two-phase system becomes homogeneous and a clear solution of o-carboxyphenyl-cis-1-propenylphosphonate is produced. This reaction is slightly exothermic and the temperature rises from 25° C. to 35° C.

To the resulting solution 2.4 ml. of concentrated hydrochloric acid is added and the mixture refluxed for two hours. The solution is cooled to 0 to 5° C., aged for one hour and the crystalline salicylic acid is separated by filtration. The filtrate is extracted with 3× 2 ml. of ether. The ethereal extracts are separated and discarded. The aqueous layer is concentrated in vacuo (17–20 mm.; water bath at 60° C.) to a small volume and flushed twice with benzene to reduce the water content. After removal of the benzene there is obtained cis-1-propenylphosphonic acid as a yellow to light brown oil which crystallizes on seeding. The yield is 85–90% of the theoretical.

A similar result is obtained when the above procedure is repeated but no hydrochloric acid is added (in the immediately preceding paragraph) before the two hour reflux period.

EXAMPLE 2

To a solution of 42 g. of 2-chloro-4-oxo-1,3-dioxa-2-phosphanaphthalene in 200 ml. of anhydrous benzene there is added a solution of 20.8 g. of triethylamine and 11.6 g. of propargyl alcohol, 200 ml. of dry benzene at 5–10° C. in a nitrogen atmosphere. The reaction mixture is aged for one hour at 25° C. during which time triethylamine hydrochloride precipitates. The solid is removed by filtration and washed with three 20 ml. portions of benzene. The filtrate contains 2-propargyloxy-4-oxo-1,3-dioxa-2-phosphanaphthalene.

The benzene solution obtained above is combined with the benzene washes and the entire solution heated at 75–80° C. for three hours. During this time the product rearranges to 2-propadienyl-4-oxo-1,3-dioxa-2-phosphanaphthalene-2-oxide. This product is used directly in the next step without isolation and purification.

To the benzene solution of 2-propadienyl-4-oxo-1,3-dioxa-2-phosphanaphthalene-2-oxide obtained above there is added 2 g. of 5% palladium on charcoal catalyst and the mixture hydrogenated at room temperature under a hydrogen pressure of 40 lbs./p.s.i. The theoretical amount of hydrogen is absorbed in 1–1.5 hours. At the end of this time the catalyst is separated by filtration, washed with two 5 ml. portions of benzene, and the combined filtrate and washes concentrated in vacuo at 40–45° C. to constant weight. There is obtained an oil consisting of 2-(1'-cis-propenyl)-4-oxo-1,3 - dioxaphosphanaphthalene - 2 - oxide.

The phosphanaphthalene-2-oxide obtained as described in the preceding paragraph is dissolved in 200 ml. of water. One ml. of concentrated hydrochloric acid is added, and the solution heated under gentle reflux for 60 minutes. The solution is then cooled to 5° C. and the solid salicylic acid separated by filtration. The filtrate is extracted with two 30 ml. portions of ethyl acetate in order to remove any solubilized salicylic acid. The organic extracts are discarded and the aqueous solution concentrated in vacuo to constant weight to afford an oily residue of cis-1-propenylphosphonic acid which crystallizes on standing, M.P. 59–61° C.

EXAMPLE 3

To a solution of 2.22 g. of 2-propadienyl-4-oxo-1,3-dioxa-2-phosphanaphthalene-2-oxide in 15 ml. of carbon tetrachloride there is added with good agitation 180 mg. of water. The reaction mixture is stirred for one hour at room temperature and then cooled to 0° C. Orthocarboxyphenyl propadienylphosphonate crystallizes and is recovered by filtration.

EXAMPLE 4

2.4 g. of o-carboxyphenyl propadienylphosphonate is dissolved in 10 ml. of water and the resulting solution refluxed for 4 hours. The solution is then cooled to 0° C., the precipitated salicylic acid removed by filtration and the aqueous filtrate concentrated in vacuo to an oil consisting of propadienylphosphonic acid.

EXAMPLE 5

To a solution of 12 g. of propadienylphosphonic acid and 60 ml. of water there is added 1 g. of palladium on charcoal catalyst. The mixture is hydrogenated at room temperature under 15 p.s.i. until the theoretical amount of hydrogen is absorbed. The catalyst is then removed by filtration and the filtrate concentrated in vacuo to a small volume. The residue is flushed with small portions of benzene to remove the last remaining water and to afford a yellow oil of cis-1-propenylphosphonic acid.

EXAMPLE 6

2.4 g. of 2-(cis-1'-propenyl)-4-oxo-1,3-dioxa-2 - phosphanaphthalene-2-oxide is dissolved in 20 ml. of water. The water is removed in vacuo at room temperature and the residue flushed with benzene to remove the last traces of water. The solid residue thus obtained is recrystallized from 10:3 chloroform:n-hexane to give crystalline o-carboxyphenyl-cis-1-propenylphosphonate, M.P. 85–90° C. The monobenzyl ammonium salt obtained on treatment of the mono ester with benzylamine melts at 143–144° C.

EXAMPLE 7

To a solution of 2.2 g. of 2-propadienyl-4-oxo-1,3-dioxa-2-phosphanaphthalene-2-oxide in 20 ml. of anhydrous benzene there is added 150 mg. of 5% palladium on carbon catalyst; the mixture is hydrogenated at 15 p.s.i. until the theoretical amount of hydrogen is absorbed. The catalyst is then separated by filtration and the filtrate concentrated to dryness in vacuo. The remaining residue is recrystallized from carbon tetrachloride to afford 2-(cis-1'-propenyl)-4-oxo-1,3-dioxa - 2 - phosphanaphthalene - 2 - oxide as white hygroscopic crystals, M.P. 55–57° C.

EXAMPLE 8

2.5 gm. of o-carboxyphenyl cis-1-propenylphosphonate is dissolved in 25 ml. of water, and the mixture refluxed for three hours. The solution is then cooled to 0° C. and filtered to remove salicylic acid. The filtrate is concentrated in vacuo to constant weight to give an oily residue of cis-1-propenylphosphonic acid which crystallizes on standing at room temperature, M.P. 55–58° C.

Any departure from the above description which conforms to the present invention is intended to be included within the scope of the claim.

What is claimed is:

1. The o-carboxyphenyl ester of propadienylphosphonic acid or cis-1-propenylphosphonic acid.

References Cited
UNITED STATES PATENTS

| | | | |
|---|---|---|---|
| 3,504,054 | 3/1970 | Cierpka | 260—983 X |
| 3,531,549 | 9/1970 | Randall | 260—983 X |

LEWIS GOTTS, Primary Examiner

R. L. RAYMOND, Assistant Examiner

U.S. Cl. X.R.

260—937, 968, 969, 973, 983; 424—222